United States Patent [19]
Fond

[11] Patent Number: 5,343,799
[45] Date of Patent: Sep. 6, 1994

[54] DEVICES FOR USE WITH ESPRESSO MACHINES

[75] Inventor: Olivier Fond, Yverdon, Switzerland

[73] Assignee: Nestec S.A., Vevey, Switzerland

[21] Appl. No.: 171,762

[22] Filed: Dec. 22, 1993

Related U.S. Application Data

[63] Continuation of Ser. No. 899,333, Jun. 16, 1992, abandoned.

[30] Foreign Application Priority Data

Jul. 5, 1991 [EP] European Pat. Off. ........ 91111210.0

[51] Int. Cl.[5] .............................................. A47J 31/24
[52] U.S. Cl. .................................... 99/295; 99/302 R
[58] Field of Search ................. 99/295, 300, 302 R, 99/307, 316

[56] References Cited

U.S. PATENT DOCUMENTS

| | | | |
|---|---|---|---|
| 726,793 | 4/1903 | Bezzera | 99/302 R |
| 1,493,984 | 5/1924 | Iglesias | 99/302 R |
| 1,750,068 | 3/1930 | Torriani | 99/302 R |
| 2,154,845 | 4/1939 | Hegwein | 99/302 R |
| 2,715,868 | 8/1955 | Brown | 99/302 R |
| 2,899,886 | 8/1959 | Rodth | 99/295 |
| 2,968,560 | 1/1961 | Goros | 99/295 |
| 3,030,874 | 4/1962 | Fiori | 99/302 R |
| 3,055,286 | 9/1962 | Valente | 99/302 R |
| 3,349,690 | 10/1967 | Heier | 99/302 R |
| 4,846,052 | 7/1989 | Favre et al. | 99/302 R |

FOREIGN PATENT DOCUMENTS

| | | | |
|---|---|---|---|
| 771447 | 10/1934 | France | 99/302 R |
| 1167814 | 12/1958 | France | 99/302 R |
| 1381849 | 11/1964 | France | 99/302 R |
| 447690 | 4/1949 | Italy | 99/302 R |
| 533076 | 9/1955 | Italy | 99/302 R |

*Primary Examiner*—Timothy F. Simone
*Assistant Examiner*—Mark Spisich
*Attorney, Agent, or Firm*—Vogt & O'Donnell

[57] ABSTRACT

Devices for extraction of a beverage material contained in a cartridge include an extraction head and a water distributing grill, a cartridge holder and a cartridge holder support which engages tightening ramps of a tightening ring of the extraction head to support the holder. Projecting elements extend from the grill in a direction away from a base of the extraction head. The cartridge holder has a frustoconical inner shape and has a seal incorporated in a rim extension.

5 Claims, 4 Drawing Sheets

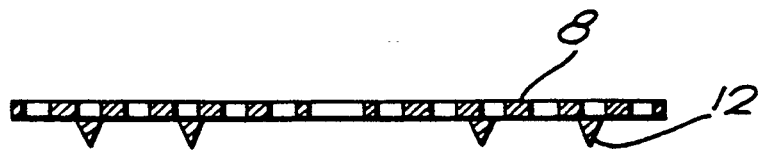
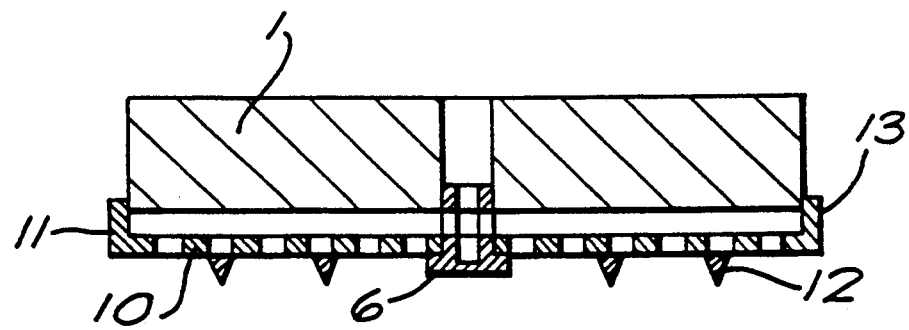
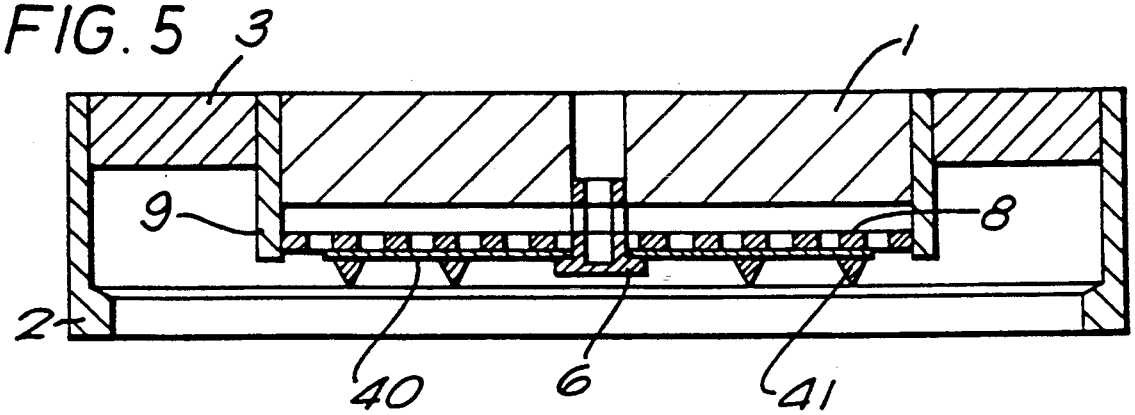
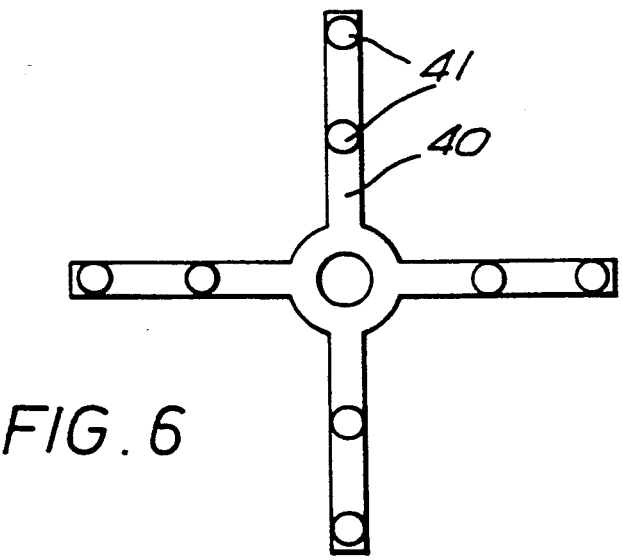

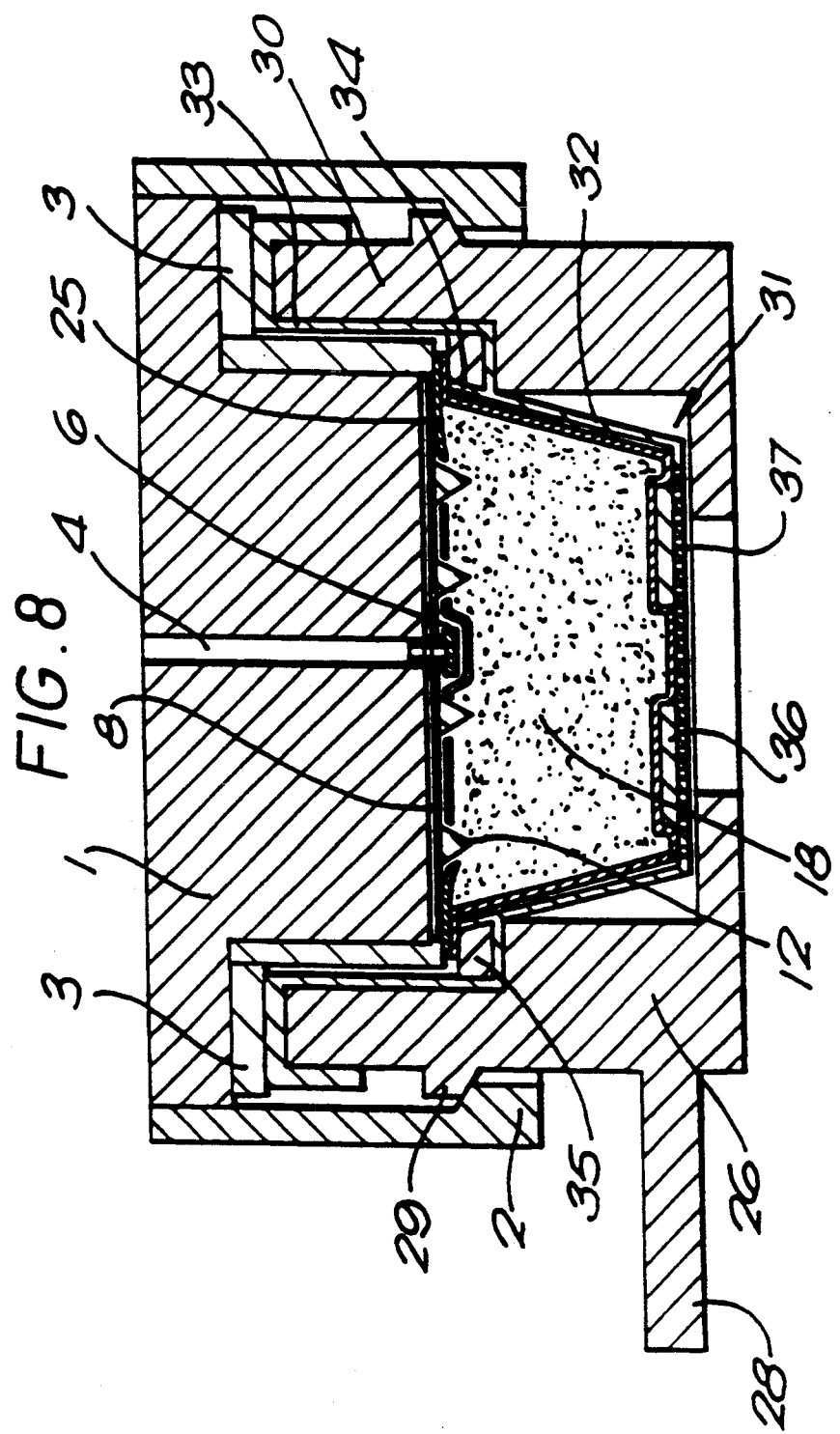

DEVICES FOR USE WITH ESPRESSO MACHINES

This application is a continuation of application Ser. No. 07/899,333, Jun. 16, 1992, now abandoned.

BACKGROUND OF THE INVENTION

This invention relates to devices for the extraction of cartridges which is designed to fit any espresso machine.

Ordinarily, espresso type coffee machines are used to extract ground coffee which has been measured out and placed beforehand in a metal filter held in a receptacle.

The upper part of espresso type coffee machines consists of a water distributing grill for spraying the coffee, a tightening ring for fixing the receptacle and a rubber seal designed to ensure fluid-tightness and good extraction by forcing the water to pass through the layer of coffee.

However, the use of this system is laborious and causes soiling and frustration because the quality of the beverage obtained does not always live up to expectations. This is because it is difficult to measure out the coffee correctly and to determine whether is has been properly ground.

The use of coffee capsules, for example those according to Swiss Patent No. 605 293, is a good alternative because handling is simplified, the quality of the coffee is better and constant, and the risk of soiling is reduced. Nevertheless, the use of coffee capsules requires perfect compatibility between the capsule and the extraction system, essentially for reasons of fluid-tightness and to force the water through the layer of coffee.

This compatibility may be embodied in the design of the machine although, in this case, the machine generally allows the use of capsules only, as for example in the device according to U.S. Pat. No. 2,451,195.

SUMMARY OF THE INVENTION

The problem addressed by the present invention was to achieve compatibility with the majority of ordinary espresso coffee machines at less cost and in a non-exclusive manner. In other words, the invention provides for alternation as required between the use of cartridges and the ordinary use of the filter with the ground coffee.

Espresso type extraction is of course well known as such and the present invention is concerned with the extraction device for the cartridges.

Where the term "receptacle is used in the present specification in connection with normal espresso machines, the term "connection holder support" is used to designate the same object in the extraction of cartridges (or capsules).

In one device according to the invention, the original grill is replaced by a water distributing additionally provided with projecting elements which tear the upper face of the cartridge to allow the water to be uniformly distributed.

The present invention also provides a cartridge holder having a frustoconical inner shape adapted to the outer shape of the cartridge to be extracted and comprising a seal incorporated in an extension of the holder outer rim. This shape is suitable in cases where the support for the cartridge holder is not the original cartridge holder support of the machine. If the original cartridge holder support of the machine is used, the outer rim of the cartridge holder is extended to follow the upper edge of the support. Instead of providing a cartridge holder arranged in the cartridge holder support, the cartridge holder and its support could also be made in one piece.

The present invention also provides an apparatus for extracting a beverage material contained in a cartridge wherein an extraction head member has a first element which has a side periphery and contains a passage which extends to an opening in a base of the first member, has a tightening ring member which is displaced away from the side of the first element to form a recess therebetween and has a ramp which extends in a direction toward the first element. A grill member is positioned to have two surfaces which extend parallel to the base of the first member and is displaced a distance away from the base. A grill rim member surrounds the periphery side of the extraction head first member and extends and is connected to the grill member. Projections which extend from a surface of the grill away from the base. A cartridge holder, having a base and wall which extends from the base to a rim about an opening, which defines a frustoconically shaped enclosure, is positioned so that the opening is adjacent the grill member. The cartridge holder has a rim extension member which extends laterally, with respect to the wall portion from the rim. The rim extension member is formed to define a groove, and a seal is positioned in the groove so that the seal and is positioned in alignment with an edge of the grill rim member. A cartridge holder support having a hollowed interior portion for containing the cartridge holder and having tightening lugs positioned on an outer periphery for engaging the extraction head tightening ramp is provided for supporting the cartridge holder.

As will be seen with reference to the accompanying drawings, the water distributing grill may be simple, i.e, may be held by a hollow screw, or may have a rim partly covering the water outlet face. In the latter case, an additional seal has to be provided and should be fitted between the new grill and the extraction block. In these two embodiments, the cartridge holder support may either be a specific cartridge holder support or the original cartridge holder support of the machine.

In a first embodiment, a specific cartridge holder support may be provided in place of the original cartridge holder support of this type of machine. In addition, a specific cartridge holder of the cartridge to be extracted should also be available. In this case, the support of the cartridge holder may comprise a tightening ring for keeping the cartridge holder in position.

In a second embodiment, the receptacle (or cartridge holder support) sold with the machine in question is available. In this case, the support of the cartridge holder is extended against the seal of the machine in the same way as the cartridge holder itself. Two fluid-tight seals are thus established, one through the seal integral with the cartridge holder and the other through the seal of the machine.

In cases where the cartridge is made of plastic and its rim is thick, the rim may act as a seal between the cartridge holder and the water distributing grill, thus eliminating the need for a specific seal on the cartridge holder.

The device according to the invention may be used for the extraction both of inverted frustum cartridges and for the extraction of frustoconical, hemispherical or cylindrical cartridges, the cross-section of the cartridges not necessarily having to be circular.

The cartridge used to carry out the process according to the invention may be selected from those according to the European patent applications filed under the titles "A rigid pack and a process for its production" (EP 91111213. 4), "A flexible pack with a stiffening element and a process for its production" (EP 91111214.2) and "An open flexible pack and a process for its production" (EP 91111209. 2). The cartridges according to European patent applications Nos. 90114404.8 and 90114405.5 and no. 91107650.3 may also be used.

It has a diameter of preferably 2.5 to 6 cm and a coffee layer thickness of preferably 10 to 25 mm.

The cartridge may contain ground and roasted coffee, but also tea, soluble coffee, a mixture of ground coffee and soluble coffee, a chocolate-flavored product or a soup and is intended for the preparation of beverages or foods in the form of infusions.

Although reference is made to closed cartridges of which the quality resides in the fact that they open automatically on extraction, considerably simplifying the manipulations and ensuring ultimate quality by protecting the coffee against oxygen until the last moment before extraction, it is important to mention the devices which is responsible for this opening. This opening has to be twofold, namely, on the upper face to allow water to be introduced and on the lower face to allow removal of the extracted coffee.

To open the upper face of the cartridge, the water distributing grill arranged on the machine has to be changed. This grill is fixed to the machine by a screw which is either hollow or formed with a few lateral orifices to allow the water to pass through from the passage in the extraction head. This grill may be replaced by another grill of the same shape and characteristic, but provided on its lower face with a few projecting points, foils or crosses which tear the upper face of the cartridges. These projecting elements may be vertical or slightly angled to increase the size of the tears made in the cartridges. In addition, these tears could be accentuated by the rotation of the support of the cartridge holder during locking to obtain fluid tightness.

In a second embodiment, the water distributing grill is left and a system carrying projecting elements, for example in the form of crosses, is superimposed thereon.

The water enters the cartridge without difficulty because, under the effect of the water pressure, the upper flexible membrane is able to flex slightly and thus to release the openings formed by the projecting elements.

These projecting elements are formed, for example, by frustoconical points between 2 and 7 mm in height with an average diameter of 2 to 5 mm or by small foils or crosses between 2 and 7 mm in height and between 1 and 3 mm in thickness cut slightly in a crest.

These elements, which are preferably between 3 and 10 in number, are distributed over the lower face of the water distributing grill in the zone corresponding to the upper internal diameter of the body of the cartridge.

The lower face may be opened by the method and part of the device according to European Patent Application No. 91107462.3. This is because the device consisting of projecting fins arranged on the flow grill of the cartridge holder has to be adapted. The lower face may also be opened with the devices according to European Patent Applications Nos. 90114401.4 and 90114403.0, i.e., with a cartridge holder comprising a central finger on its lower part, optionally with radial fins.

In cases where open cartridges made of filter paper or nonwoven fibers are used, no modification need be made to the flow distributing grill of the machine. A pressure-sensitive water-retaining system can be provided downstream of the layer of coffee. This system is provided, for example, on the cartridge holder support and may be opened mechanically, electrically, magnetically or electromagnetically.

The invention is described in more detail in the following with reference to the accompanying drawings.

BRIEF DESCRIPTION OF THE DRAWINGS

FIG. 3 illustrates the grill modified according to the invention.

FIG. 4 illustrates the extraction head modified in accordance with the invention.

FIG. 5 illustrates the extraction head modified in accordance with another embodiment.

FIG. 6 is a view from below of the projecting elements shown in FIG. 5.

FIG. 8 diagrammatically illustrates the cartridge to be extracted and a device according to the invention in another embodiment.

DETAILED DESCRIPTION OF THE DRAWINGS

Figure 1:
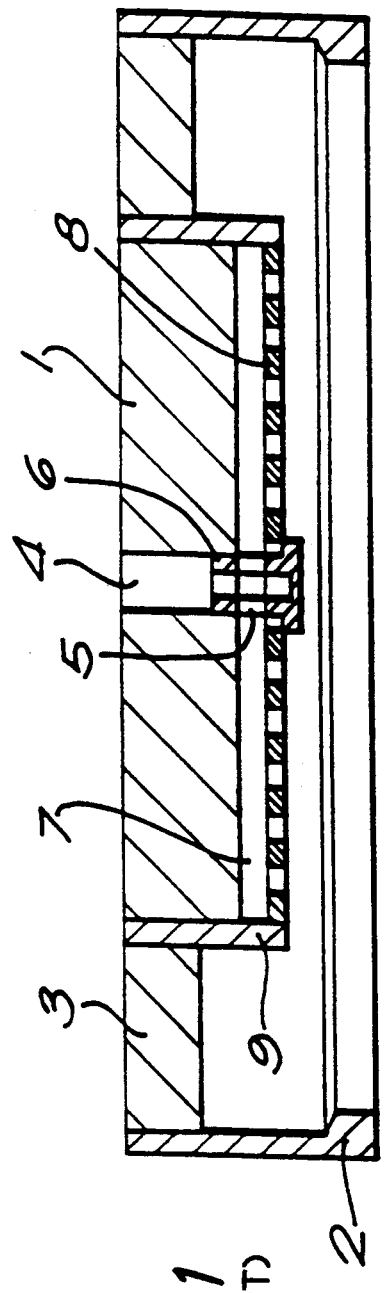
FIG. 1 diagrammatically illustrates the extraction head and tightening ring of a standard espresso machine.

FIG. 1 shows a conventional extraction head (1) of an espresso type coffee machine. It comprises a tightening ring (2) for the receptacle (not shown). The seal (3) establishes fluid-tightness during the extraction process. The water arrives through the passage (4) and passes through the orifices (5) of the hollow screw (6) for distribution in the chamber (7). It then passes through the water distributing grill (8) to impinge in the form of a spray on the layer of coffee (not shown). The grill (8) is held by rim (9) which extends to be positioned between seal (3) and the extraction head member which contains passage (4) and in a cylindrical recess positioned between tightening ring (2) and rim (9) of the extraction head.

Figure 2:
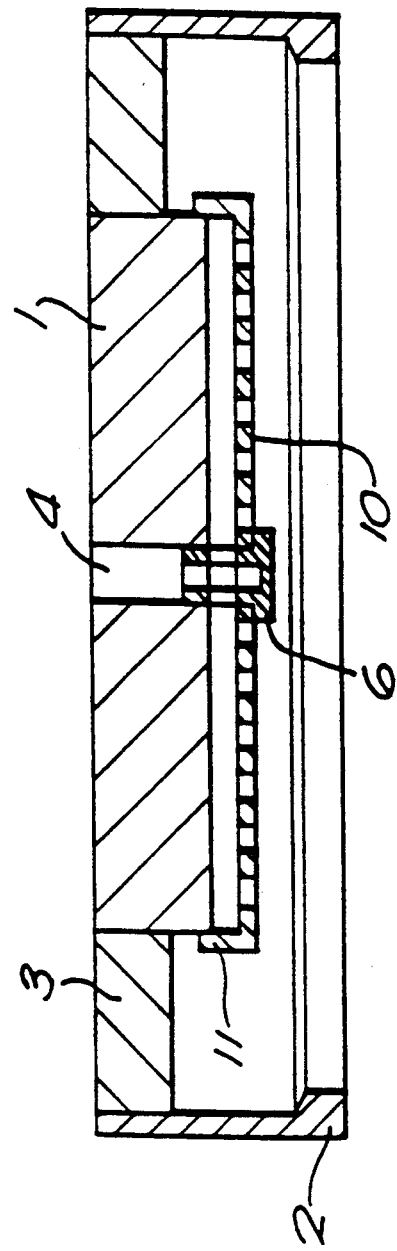
FIG. 2 diagrammatically illustrates the extraction head and-tightening ring of a standard espresso machine in another configuration.

FIG. 2 shows a second embodiment of the extraction head. The same parts are denoted by the same reference numerals as in FIG. 1. In this case, the grill (10) has a metal rim (11).

As shown in FIG. 3, the grill (8) is modified by the welding on of projecting elements (12) for opening the upper face of the cartridges to be extracted. The grill thus modified is then arranged on the extraction head shown in FIG. 1.

In FIG. 4, the extraction head shown in FIG. 2 is modified. A seal (13) is provided on the metal rim (11) to ensure the fluid-tightness of the system and the projecting elements (12) are welded to the grill (10).

In FIG. 5, the extraction head shown in FIG. 1 is modified. A system (40), as also illustrated in FIG. 6, carrying projecting elements (41) is fixed by means of the hollow screw (6). The advantage of this solution is that it provides for easy return to the previous state by removal of the system (40).

Figure 7:
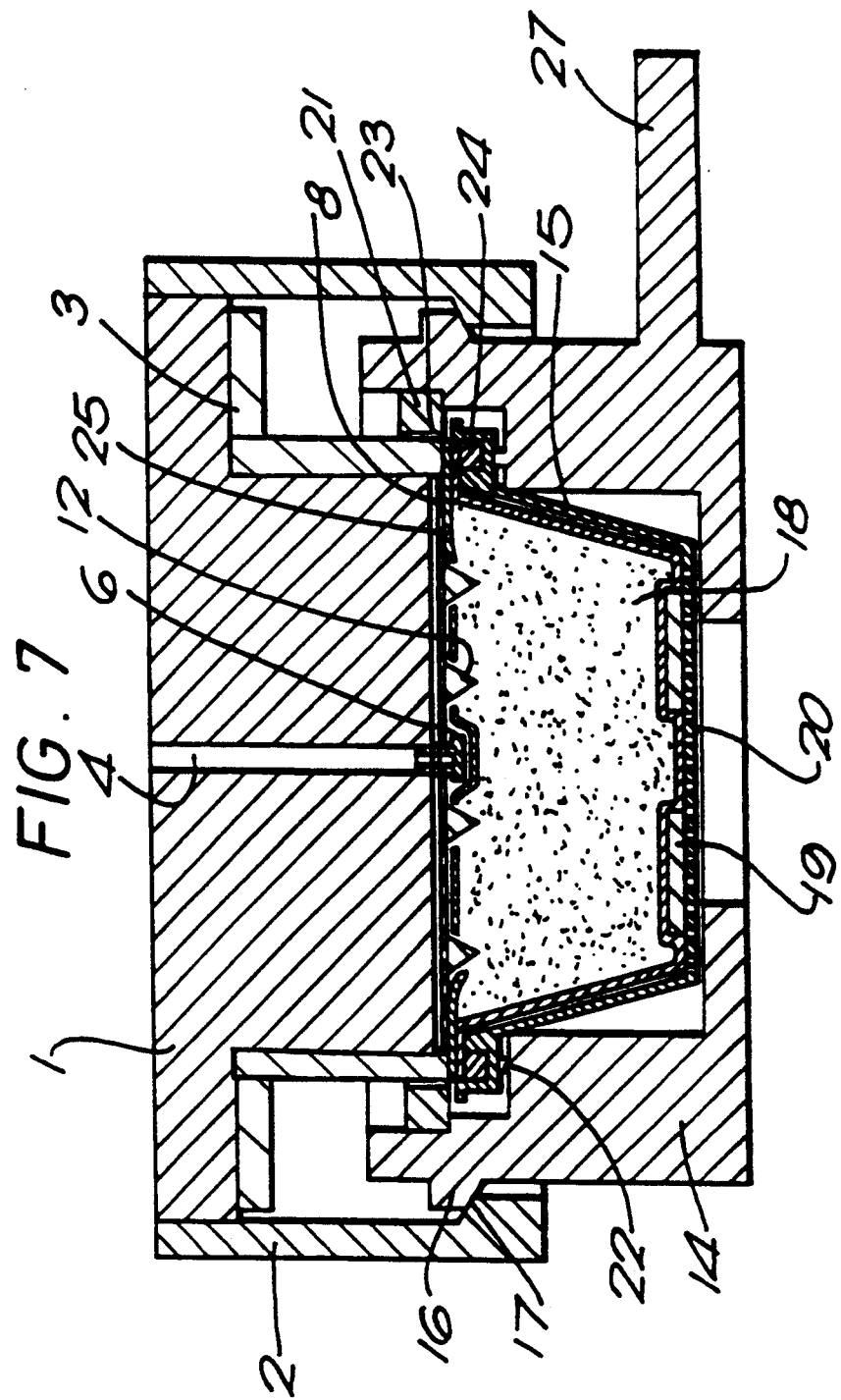
FIG. 7 diagrammatically illustrates the cartridge to be extracted and a device according to the invention.

FIGS. 7 and 8 show a device according to the invention with an extraction head of the type shown in FIG. 1.

A conventional espresso machine is available in the device shown in FIG. 7, a cartridge holder support (14) and a cartridge holder (15) being supplied with the machine. The support (14) comprises tightening lugs (16) which engage on the tightening ramps (17) of the tightening ring (2).

The cartridge holder (15) has an upper rim (23) which defines the holder opening positioned adjacent the grill (8) and from which a rim extension extends, laterally with respect to the sidewall portion of the holder, from the rim and is formed to have three wall portions which define a groove positioned at a position beneath the rim and in which a seal (24) is positioned for keeping the cartridge (18) to be extracted in place and guaranteeing perfect fluid-tightness during the extraction process. On its base, the cartridge holder (15) additionally comprises recessed or relief elements (19) and a flow grill (20) according to European Patent application No. 92101389.2 the grill (20) which forms the holder base being substantially planar, as illustrated. The tightening ring (21) of the support (14) enables the cartridge holder to be held in place in the support.

In operation, the cartridge (18) is placed in the cartridge holder (15) which is itself arranged in the cartridge holder support (14). It should be noted that the cartridge holder (15) is able to turn in the support (14) on a support ring (22). The support (14) is engaged through its tightening lugs (16) in the tightening ring (2). When the support is engaged, the grill (8) and its projecting elements (12) penetrate into the upper face (25) of the cartridge to be extracted. When the machine is started up, the water arrives through the passage (4) and is uniformly distributed over the grill (8), passes through the grill and then enters the cartridge through the openings formed by the projecting elements (12). There is an increase in pressure in the cartridge and the lower face of the cartridge bears against the projecting elements (19) until it reaches its breaking strain. The coffee then flows through the grill (20) and is collected in a container (not shown). The seal (24) effectively seals the periphery of the upper face (25) of the cartridge to guarantee the fluid tightness of the system during the increase in pressure because this pressure can reach values of up to 15 bar.

FIG. 8 shows a second embodiment of the device according to the invention. The same parts as in FIG. 7 have been denoted by the same reference numerals. The difference between the embodiment shown in FIG. 8 and that shown in FIG. 7 lies in the use of the original cartridge holder support (26) of this conventional espresso machine which comprises a handle (28) and an upper cylindrical border (30) enabling the upper rim of the cartridge holder which, as illustrated, has a first outer portion which extends into the head recess to surround the head side periphery and to a second portion which extends from the periphery towards the tightening ring to a third portion which extends to form, together with the other portions, a groove to be applied to the seal (3) of the extraction head (1). The tightening lugs (29) of the support (26) engage in the tightening ring (2) of the machine.

The cartridge holder (31) of FIG. 8 is different from that shown in FIG. 7. It comprises a recess (32) for the cartridge (18) to be extracted and an upper cylindrical part (33) which engages between the upper cylindrical border (30) of the cartridge holder support and the seal (3) of the extraction head. The cartridge holder comprises an intermediate border (34) with a seal (35) which guarantees primary fluid tightness during extraction of the cartridge (18), the seal (3) additionally providing secondary fluid tightness.

The device operates in the same way as the device shown in FIG. 7, the lower part of the cartridge (18) being opened by projecting elements (36) integral with the base of the cartridge holder (31) during the increase in pressure in the cartridge when the lower part reaches its breaking strain. The coffee then flows through the grill (37).

I claim:

1. A device for containing a cartridge which contains a material to be extracted for preparation of a beverage and or use with an extraction apparatus of the type including an extraction head wherein the extraction head has a base, an annular peripheral sidewall portion which extends from and laterally with respect to the base, and a member which forms an extraction head base grill for distributing water from a passage opening in the base and which extends to an annular grill rim positioned adjacent the peripheral sidewall portion of the extraction head, the device comprising:

a cartridge holder member having a substantially planar base for supporting a cartridge which contains a material to be extracted for preparation of a beverage and having inner and outer annular wall surfaces which extend about and from the holder base to an edge to form a frustoconically shaped holder enclosure having an opening defined by the wall edge for being positioned adjacent the base grill; and a holder extension member which is integral with the outer wall surface and has a first portion which extends laterally away from the outer wall surface and which is substantially parallel to the base and a second portion which is substantially perpendicular to the first portion and extends in a direction away from the base to define a groove between the outer wall surface and second portion at a position suitable for being fitted adjacent the grill rim, the groove further being laterally spaced from the outer wall surface; and a seal positioned in the groove for providing a seal between the holder member and the grill rim during extraction of the beverage in the cartridge.

2. A device according to claim 1 wherein the second portion extends beyond the wall edge and wherein the extension member has a third portion which extends laterally from the second portion in a direction parallel to the base and has a fourth portion which extends laterally from the third portion in a direction perpendicular to the third portion.

3. An apparatus for extracting a material contained in a cartridge for preparation of a beverage comprising:

an extension head which has a base and an annular peripheral sidewall portion which extends from and laterally with respect to the base and which has a water delivery passage which extends to an opening in the base;

a member which has opposing first and second surfaces having a plurality of openings which form a base grill and which extend parallel to the extraction head base for distributing water from the extraction head base opening and which extend to an annular rim positioned adjacent the extraction head peripheral sidewall portion so that the first grill surface faces the extraction head base opening and is displaced a distance away from the extraction head base opening;

projections which are suitable for piercing a cartridge containing a material to be extracted for preparation of a beverage and which extend from the second grill surface in a direction away from the first and second surfaces and the extraction head base;

a tightening ring which is connected to the extraction head and which extends to a portion having an inner surface which is coaxial with and displaced away from the grill rim to form a recess therebetween and which has a ramp which extends laterally therefrom;

a cartridge holder member having a substantially planar base for supporting a cartridge containing a material to be extracted for preparation of a beverage and having a inner and outer annular wall surfaces which extend from the holder base to an edge to form a frustoconically shaped holder enclosure having an opening defined by the wall edge for being positioned adjacent the base grill and having an extension member which is integral with the outer wall surface and has a first portion which extends laterally away from the outer wall surface and which is substantially parallel to the base and a second portion which is substantially perpendicular to the first portion and extends in a direction away from the base to define a groove between the outer wall surface and second portion at a position suitable for being fitted adjacent the rill rim and having a seal positioned in the groove for providing a seal between the holder member and the grill rim, the groove further being laterally spaced from the outer wall surface; and a cartridge holder support member having an interior base surface for supporting the cartridge holder base and having an interior wall portion which extends laterally from the base surface for a distance suitable for supporting and fitting the cartridge holder extension member adjacent the grill rim and having an outer surface having lugs extending therefrom at a position for engaging the tightening ring ramp for supporting the cartridge holder so that the extension member is supported and fitted adjacent the grill rim during extraction of the beverage in the cartridge.

4. An apparatus according to claim 3 wherein the grill rim extends about the extraction head sidewall peripheral portion to a surface which extends laterally with respect to the grill rim to the tightening ring portion and further comprising a second seal positioned adjacent the surface and wherein the second portion extends beyond the wall edge into the recess and adjacent the grill rim and has a third portion which extends laterally from the second portion in a direction parallel to the base and has a fourth portion which extends literally from the third portion in a direction perpendicular to the third portion and towards the plane, wherein the second portion extends for a distance so that the third portion is at a position suitable for being fitted adjacent the second seal.

5. An apparatus according to claim 3 further comprising a ring positioned between the grill rim and an interior portion of the cartridge holder support member for holding the support and holder in place.

* * * * *

UNITED STATES PATENT AND TRADEMARK OFFICE
CERTIFICATE OF CORRECTION

PATENT NO. : 5,343,799
DATED : September 6, 1994
INVENTOR(S) : Olivier FOND

It is certified that error appears in the above-indentified patent and that said Letters Patent is hereby corrected as shown below:

Column 2, between lines 33 and 34, insert --DETAILED DESCRIPTION OF THE INVENTION--.

Column 6, line 17 (line 3 of claim 1), "or" should be --for--.

Column 6, line 18 (line 4 of claim 1), insert a comma after "head".

Column 7, line 32 (line 45 of claim 3), "rill" should be --grill--.

Column 8, line 25 (line 11 of claim 4), "literally" should be --laterally--.

Signed and Sealed this

Sixth Day of December, 1994

*Attest:*

BRUCE LEHMAN

*Attesting Officer*     *Commissioner of Patents and Trademarks*